(12) United States Patent
Bordbar et al.

(10) Patent No.: US 12,028,418 B1
(45) Date of Patent: Jul. 2, 2024

(54) VIRTUAL REALITY INTERACTION FREE FROM VIDEO STREAMING

(71) Applicant: CyberDyme, Inc., Sherman Oaks, CA (US)

(72) Inventors: Alexander Bordbar, Los Angeles, CA (US); Juan Sotelo, Los Angeles, CA (US); Andrei Gireada, Bucharest (RO)

(73) Assignee: CyberDyme, Inc., Sherman Oaks, CA (US)

( * ) Notice: Subject to any disclaimer, the term of this patent is extended or adjusted under 35 U.S.C. 154(b) by 0 days.

(21) Appl. No.: 18/091,981

(22) Filed: Dec. 30, 2022

Related U.S. Application Data (60) Provisional application No. 63/395,681, filed on Aug. 5, 2022.

(51) Int. Cl.
*H04L 67/131* (2022.01)

(52) U.S. Cl.
CPC .................................. *H04L 67/131* (2022.05)

(58) Field of Classification Search
CPC .................................................... H04L 67/131
USPC ......................................................... 709/217
See application file for complete search history.

(56) References Cited

U.S. PATENT DOCUMENTS

| | | | |
|---|---|---|---|
| 9,665,985 B2 | 5/2017 | Mullins et al. | |
| 10,777,009 B2 | 9/2020 | Martin et al. | |
| 11,200,742 B1 * | 12/2021 | Post | G06T 19/003 |
| 11,363,240 B2 | 6/2022 | Valli | |
| 11,456,887 B1 * | 9/2022 | McCracken | H04L 12/1822 |
| 11,630,633 B1 * | 4/2023 | MacDougall | G06F 3/011 |
| | | | 715/204 |
| 2002/0129159 A1 * | 9/2002 | Luby | H04L 69/14 |
| | | | 709/236 |
| 2013/0194304 A1 | 8/2013 | Latta et al. | |
| 2016/0269508 A1 * | 9/2016 | Sharma | H04L 63/0884 |
| 2016/0283081 A1 * | 9/2016 | Johnston | H04N 23/695 |
| 2016/0330295 A1 | 11/2016 | Chiappone et al. | |
| 2017/0277412 A1 * | 9/2017 | Curtis | G06Q 30/0643 |
| 2018/0067547 A1 * | 3/2018 | Russell | G02B 27/0172 |
| 2019/0066198 A1 * | 2/2019 | Keeler | G06Q 30/0643 |
| 2019/0221031 A1 * | 7/2019 | de la Carcova | A63J 5/02 |
| 2019/0228370 A1 * | 7/2019 | Lien | G06Q 10/063112 |
| 2019/0332400 A1 * | 10/2019 | Spoor | G06F 3/013 |
| 2019/0334876 A1 * | 10/2019 | Adams | H04L 63/0428 |
| 2020/0233485 A1 * | 7/2020 | Chan | A61B 5/00 |
| 2022/0075504 A1 * | 3/2022 | Little | G06T 19/20 |
| 2022/0207657 A1 * | 6/2022 | Petkov | G06T 5/50 |
| 2022/0366689 A1 * | 11/2022 | Little | G06Q 40/08 |
| 2023/0013828 A1 * | 1/2023 | Rakshit | H04L 65/1069 |

* cited by examiner

*Primary Examiner* — David P Zarka
(74) *Attorney, Agent, or Firm* — Wilson Sonsini Goodrich & Rosati (57) ABSTRACT

A virtual reality software method allows a user in virtual reality to receive customer service remotely from a live operator having a live view as well as remote-control abilities. The software process sends no live video, but encodes and decodes a computational instructional set of commands that are streamed then decoded and processed as instructional commands to emulate a live rendering of the sender to receiver and vice versa. The operator can see an emulated live stream of a user in virtual reality with the ability to offer assistance by remote control.

20 Claims, 7 Drawing Sheets

VIRTUAL REALITY INTERACTION FREE FROM VIDEO STREAMING

CROSS-REFERENCE TO RELATED APPLICATIONS

This application claims the benefit of U.S. Provisional Patent Application 63/395,681, filed on Aug. 5, 2022, and is incorporated herein by reference.

STATEMENT REGARDING FEDERALLY SPONSORED RESEARCH AND DEVELOPMENT

Not Applicable.

FIELD OF THE INVENTION

This invention relates to a virtual reality software process that enables a user to receive customer support via various communication modalities, including but not limited to voice chat, screenshare, and push notification, to facilitate an overall virtual reality experience.

BACKGROUND

Interactive technology has evolved from web browsing, to mobile adoption, and now to virtual reality. Now a user can place viewing goggles over their eyes to simulate a 3-dimensional (3D) environment rich in movement, depth, and perception. Virtual reality allows users to have an immersive 3D experience resembling and replicating an environment as if the user were in that location. The simulation of such reality can deliver an enhanced experience customized to a user's preference.

An inherent problem in virtual reality is that while the experience may visually mimic a real-world environment, the interaction per se is not real and areas requiring external customer support or intervention can be deficient compared to the real-world. Furthermore, because the technology is new and non-ubiquitous, it increases the chance that assistance and interaction may be needed. Consider, for example, a user in a virtual reality experience that involves shopping for clothing. A user in this experience may have full access to a product library filled with immersive and interactive content. The user may feel as if they are in a real-world environment and even achieve a parallel shopping experience in the viewing of products in virtual reality comparable to that of a real-world store. The experience in virtual reality may feel powerful until the user realizes they need assistance. From this point on, the real-world emulation quickly fades away as the notion of a live person to provide assistance is missing.

The issue is not just with shopping; consider another example, a real estate development company showcasing a virtual reality experience of a resort under construction and using virtual reality to deliver a simulation rendering the vision of the completed project. An operator dispensing the presentation has no immediate access or way to see and make sure the end user in the virtual reality experience is properly interacting with the demo as desired. The operator would be required to interrupt and ask the end user to verbally explain their position, location, or area in the presentation. This alone becomes a distraction, diminishing the purpose of the presentation. Furthermore, if a user experiences friction, such as being unable to navigate the experience, unable to find a button or selection, it can be difficult for the operator to know, which leads to a negative disposition of the user and experience.

Therefore, there is a need for a virtual reality software process and system that enables a user to receive customer support via various communication modalities, including but not limited to voice chat, screenshare, and push notification, to facilitate an overall virtual reality experience. The present invention accomplishes these objectives.

SUMMARY OF THE INVENTION

What's missing in present day virtual reality systems is both a proactive and a reactive support system. A proactive method is one where the operator can see a live stream of a user in virtual reality in an applicable demonstration or simulation experience with the ability to offer assistance, whether by verbal cues after seeing the end user in the experience or by remote controlled access to control the experience on behalf of the end user.

Additionally, a reactive method is needed, such that when a user undertaking an experience requires assistance, they can easily in virtual reality reach out to the operator and request help.

The present invention accomplishes a method of customer service assistance in virtual reality in real time, with real people.

The present device is a computer implemented method of providing support from a live operator to a user in a virtual reality environment (VRE). The method includes broadcasting an experience from the user to the live operator and permitting the live operator to have an interaction with the user in the VRE. In some embodiments, the step of broadcasting the experience is free from any streaming of video between the user and the live operator. In some embodiments, the method further includes receiving a request for support from a user operating in the VRE and sending the request to a live operator. In some embodiments, the step of broadcasting the experience is performed after the step of receiving the request for support. In some embodiments, the interaction includes at least one of voice chat assistance, virtual presence in the VRE, directional assistance, order placement assistance and taking over the VRE. In some embodiments, when the live operator takes over the VRE, the user sees, in the VRE, actions taken by the live operator after the live operate takes control of the VRE. In some embodiments, the actions taken by the live operator are broadcast to the user as a computational instructional set of commands between the live operator and the user that are encoded, streamed and then decoded and processed as instructional commands to emulate a live rendering or replay of the actions taken by the live operator.

According to aspects of the present invention, the step of broadcasting the experience includes encoding payloads of data in sequential operations, wherein the payloads of data are streamed in real time between the user and the live operator. In some embodiments, the data includes at least one of activity data, metadata, direction movement data, screen location data and screen selection data.

According to aspects of the present invention, the live operator monitors the broadcast of the experience and the live operator is permitted to offer assistance to the user during the user experiencing the VRE. In some embodiments, the assistance includes at least one of voice chat assistance, virtual presence in the VRE, directional assistance, order placement assistance and taking over the VRE.

According to aspects of the present invention, the method further includes removing movements in the VRE when sent by the live operator to the user to affect an anti-nausea filter.

The present invention can provide both a proactive method, where the operator can see a live stream of a user in virtual reality in an applicable demonstration or simulation experience with the ability to offer assistance, and a reactive method, where a user they can easily, in virtual reality, reach out to the operator and request help. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

The present invention describes a proactive and reactive support process in virtual reality whereby an end user in a virtual reality experience can achieve various communication and support modalities such as, but not limited to, talking to a live operator, broadcasting their experience to the operator, and receiving help, suggestions, and even full-service remote assistance in areas of ordering processing, management and fulfillment.

In a reactive scenario, a user in a virtual reality experience can reach out to the operator by selecting the "live help" option from an internal virtual reality menu, whereby a remote operator on a computer can see a queue of support calls, answer the call and voice chat, and assist the user directly. The operator can recommend products or services, push content, and assist in ordering, for example.

In a proactive support situation, the operator, with their computer or tablet, can see a live view of the end user in the VR experience. The operator can immediately help a customer and take control over the experience as if the operator were themselves in the virtual reality experience.

In both situations, if the operator takes control of the end user's VR experience the end user can see the buttons pushed, selections chosen and event actions. Since virtual reality mimics the real-world environment, 3D geometrical movement from a remote operator that wasn't initiated from the end user in the virtual reality experience has a high likelihood of triggering a nauseous effect on the end user. Accordingly, in some embodiments, an anti-nausea function filter is applied, such that rotational movement when conducted from the operator is not sent to the end user in the VR experience and instead a static transition effect or discontinuous event occurs in lieu of a 3D geometrical movement.

Figure 1:
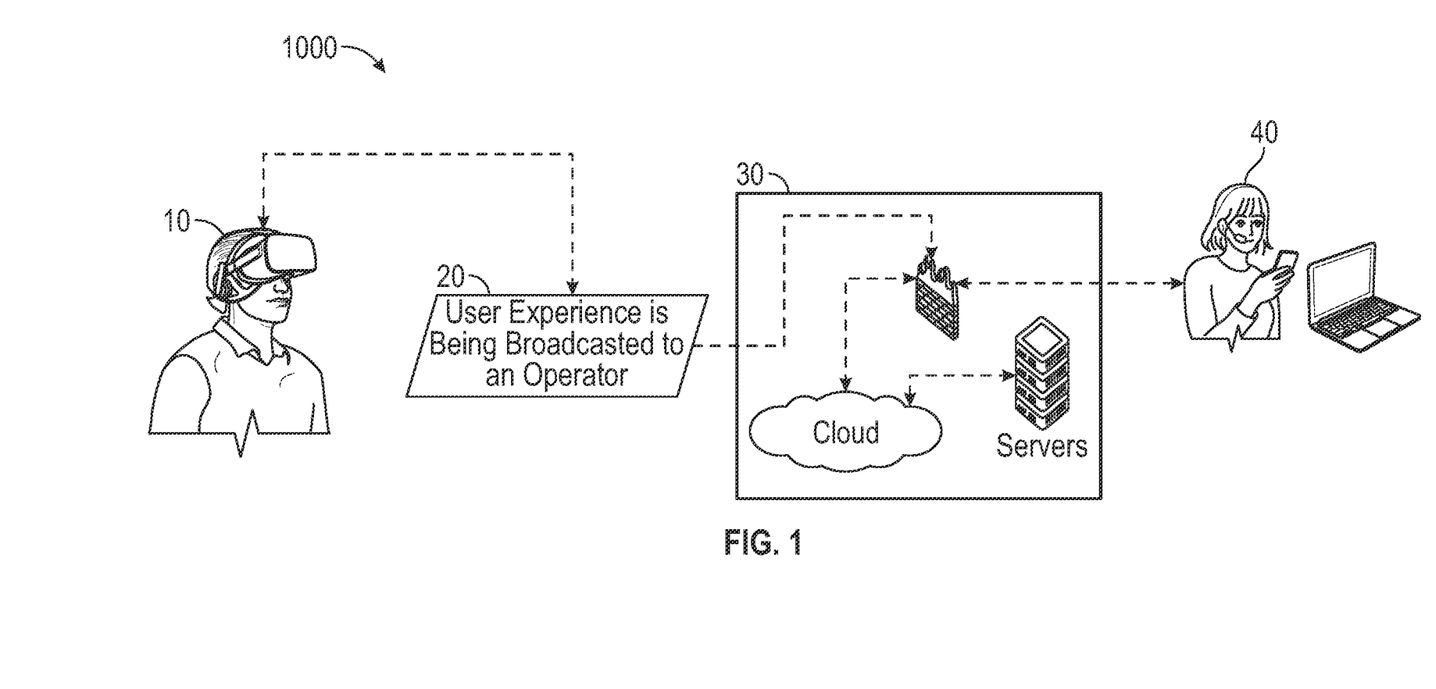
FIG. 1 is a system diagram of a virtual reality environment of the present invention.

FIG. 1 depicts a system 1000 for enabling a user 10, in the virtual reality (VR) environment via a streaming process 20, layered on a traditional internet network system 30, to interact with an operator 40, such as a live operator, and to communicate via voice, and to allow remote commands from the operator 40 to control the system of user 10. The VR environment must be ready to interact with the customer service system, and such readiness is done via a software integration.

Figure 2:
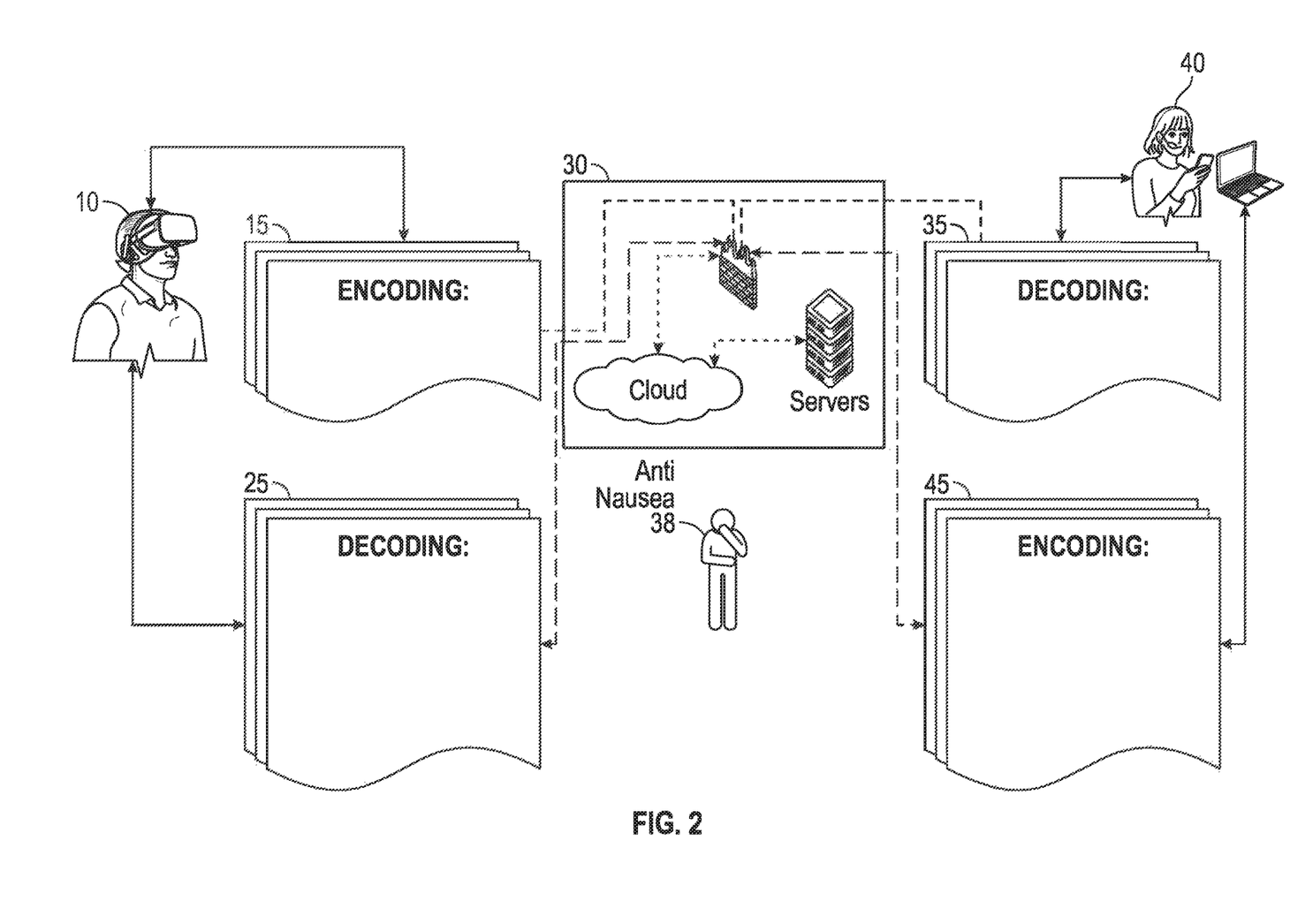
FIG. 2 is an expanded system diagram of the virtual reality support process interactions and the technology procedure of streaming sequential operational commands via encoding/decoding processes.

FIG. 2 depicts the expansion of FIG. 1 and of the virtual reality embodiment, showing the method of transmission of the user 10, such that activity of the user 10 is transmitting not as a video stream, but rather as instructional data, to include activity, metadata, directional movement, screen location, and screen selections, which are encoded, via an encoding process 15, into payloads of data in sequential operations, and streamed in real time. The receiving end receives decoded data via a decoding process 35. The decoding of this data on the CPU of the operator, 40, reproduces each step, rendering the parallel emulated live stream of the user 10, on the device of the operator 40.

In the reverse manner, if the operator 40 performs operational steps, e.g., making a selection, or moving towards an area in the experience, the activity, metadata, directional movement, screen location, screen selections of the operator 40 are encoded into payloads of data as shown in the encoding process 45, and streamed in real time, where on the receiving end this data then undergoes a decoding process 25 into reproducible instructions, upon which the CPU of the user 10 executes such instructions, rendering the emulated live stream user experience.

In FIG. 2, a software code filter 38 is provided, such that when geospatial movement from the operator 40 is sent to the user 10, this instruction is removed and replaced with static transition effects, such that the user 10 will not see the movement of the operator 40, which could cause a nausea event for the user 10.

Figure 3:
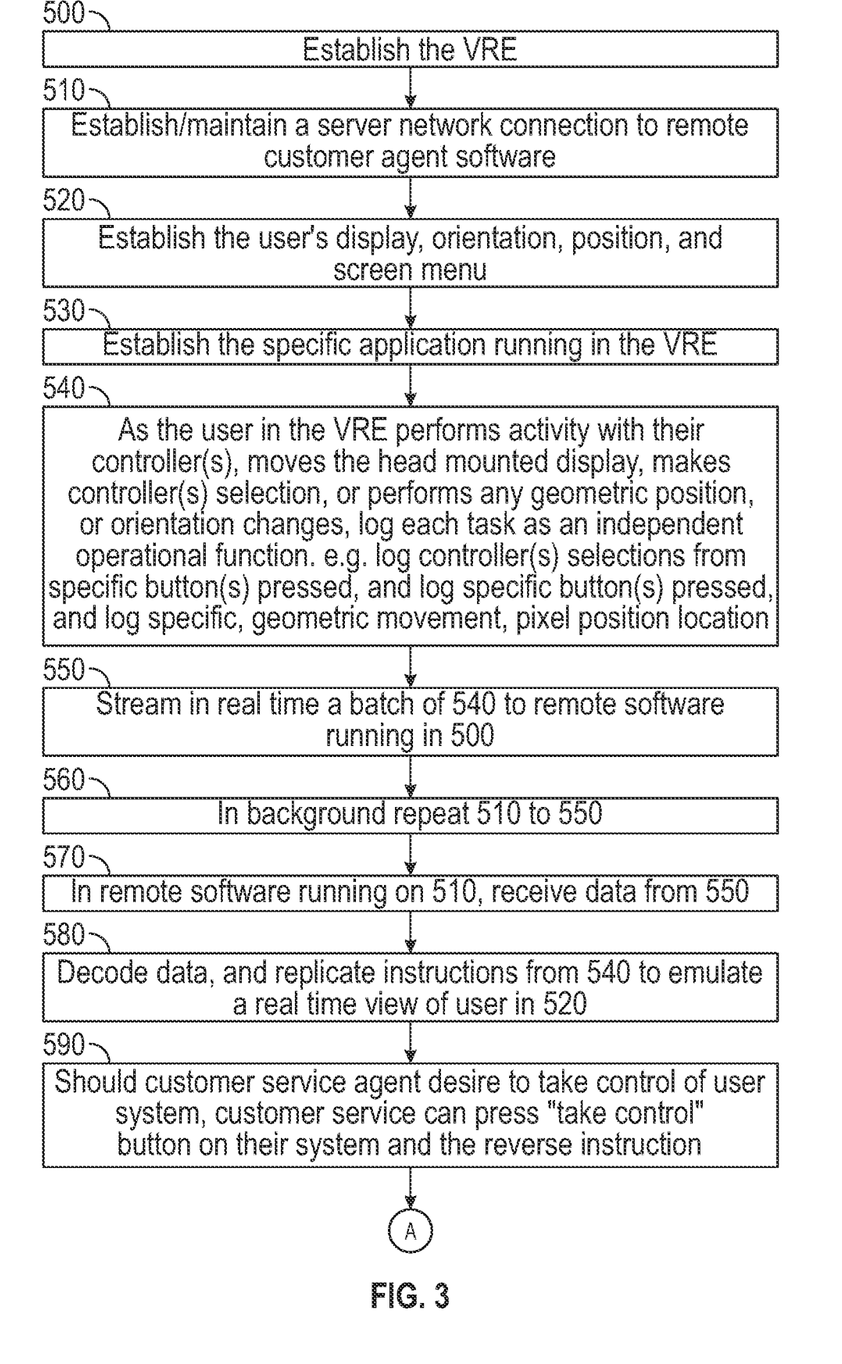
FIG. 3 is a flow chart illustrating a process of the present invention.

FIG. 3 illustrates an expanded procedural flowchart of the system 100 of FIG. 1, as follows. In step 500, the Virtual reality Environment (VRE) is established. In step 510, a server network 30 (FIG. 1) connection to remote customer service software 32 (FIG. 1) is established and maintained. In step 520, the user's display, orientation, position, and screen menu are established. In step 530, the application running in the VRE of the user 10 is established. In step 540, as the user 10 in the VRE performs activity, makes controller(s) selection, or performs any geometric position, or orientation changes, each task can be logged as an independent operational function. For example, the method can log controller(s) selections from specific button(s) pressed, and log specific, geometric movement, and pixel position location. In step 540, the log of each operational function and group can be generated as a payload of data operations encoded in incremental batches based on time and activity. In step 550, a batch of the payload of data operations generated in step 540 can be sent, in real time, to the remote software running in the VRE established in step 500. In step 560, steps 510 through 550 can be repeated.

In step 570, in the remote software running on the server network 30 that was established in step 510, can receive data from the sending step of step 550. In step 580, data can be decoded and the instructions from step 540 can be replicated to emulate a real time view of the user's display established in step 520. In step 590, should the operator 40 desire to take control of the user's system, the operator can press the "take control" button 590 (FIG. 5) on the operator's system and the reverse instructions are performed as follows.

In step 600, as an operator moves the mouse, tablet or input peripheral device, the operator's action can be shown, for example, an item 605 depicts the actions of the operator 40 showing a video timeline being advanced. Each task can be logged as an independent operational function, or selections from specific button(s) pressed, and specific, geometric movement and pixel position location can be logged. At step 610, the log of each operational function and group can be generated as a payload of data operations encoded in incremental batches based on time and activity. In step 620, a batch of the data from step 610 can be streamed, in real time, to the user 10 via the established connection in step 510. In step 630, the data can be decoded and the instructions can be replicated from the date generated in step 610. In step 640, the process can be repeated as needed or desired.

Figure 4:
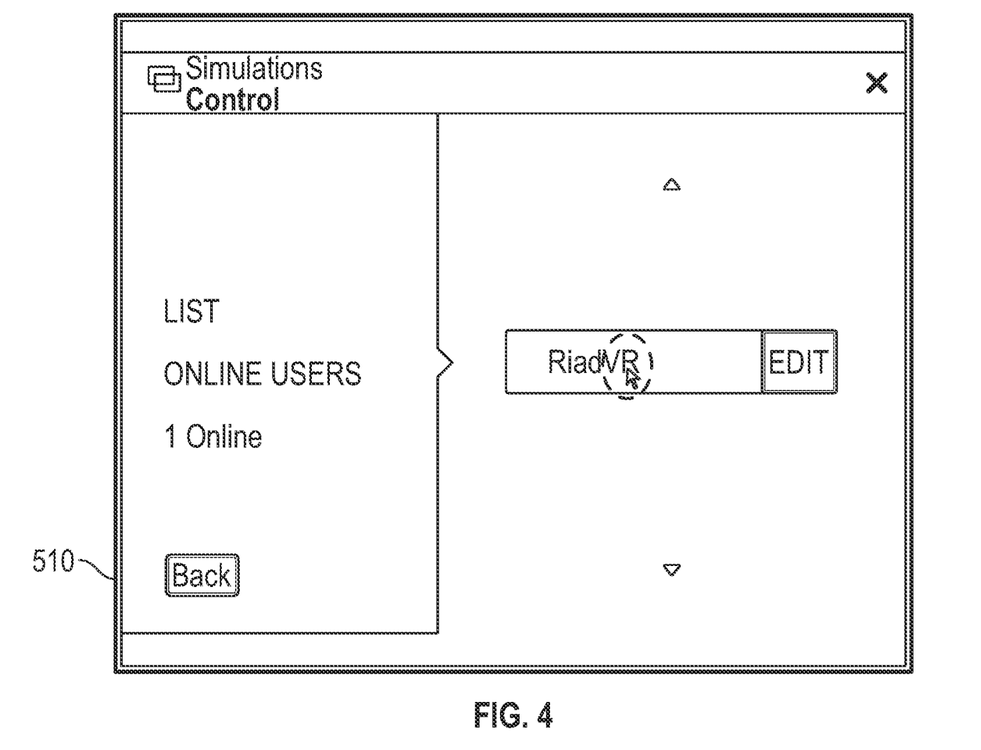
FIG. 4 is an example user interface illustrating a user requesting help from within the VR environment.

FIG. 4 illustrates a visual of the step 510 of FIG. 3, depicting the operator 40 in the customer service software 32 (FIG. 1).

Figure 5:
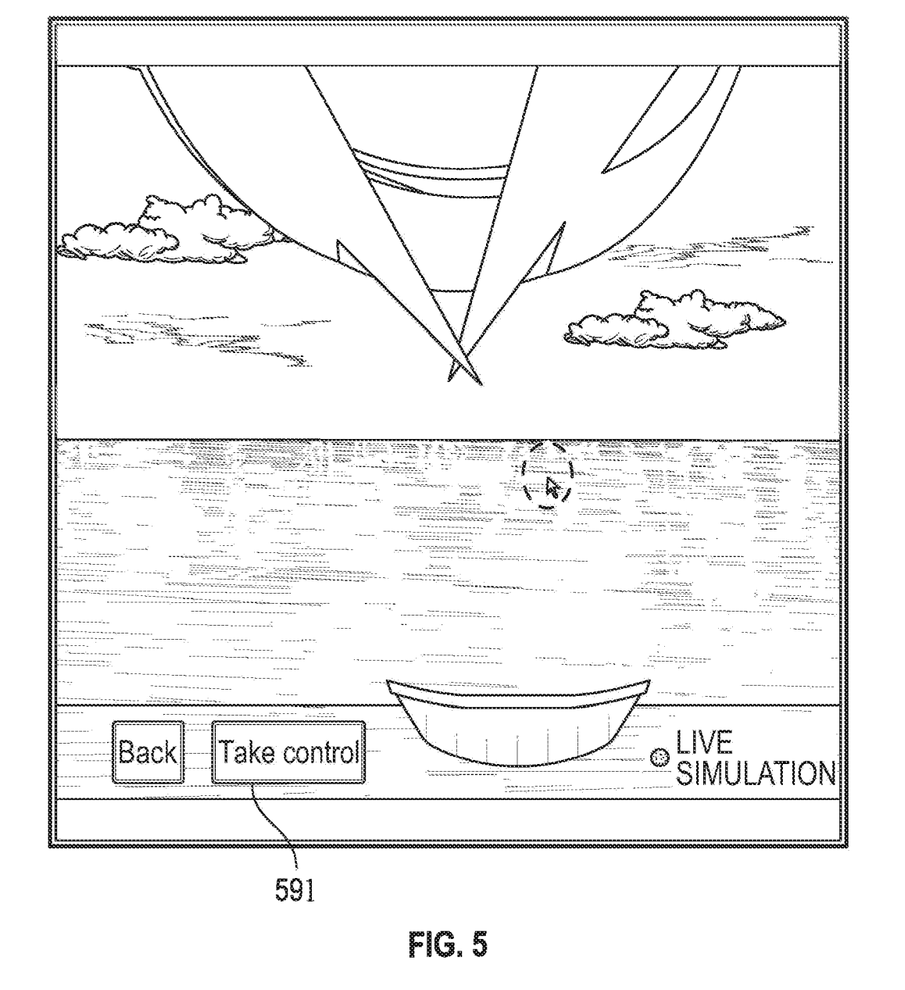
FIG. 5 is an example of another user interface.

FIG. 5 illustrates a visual of the step 590 of FIG. 3, depicting the "take control" button 591.

Figure 6:
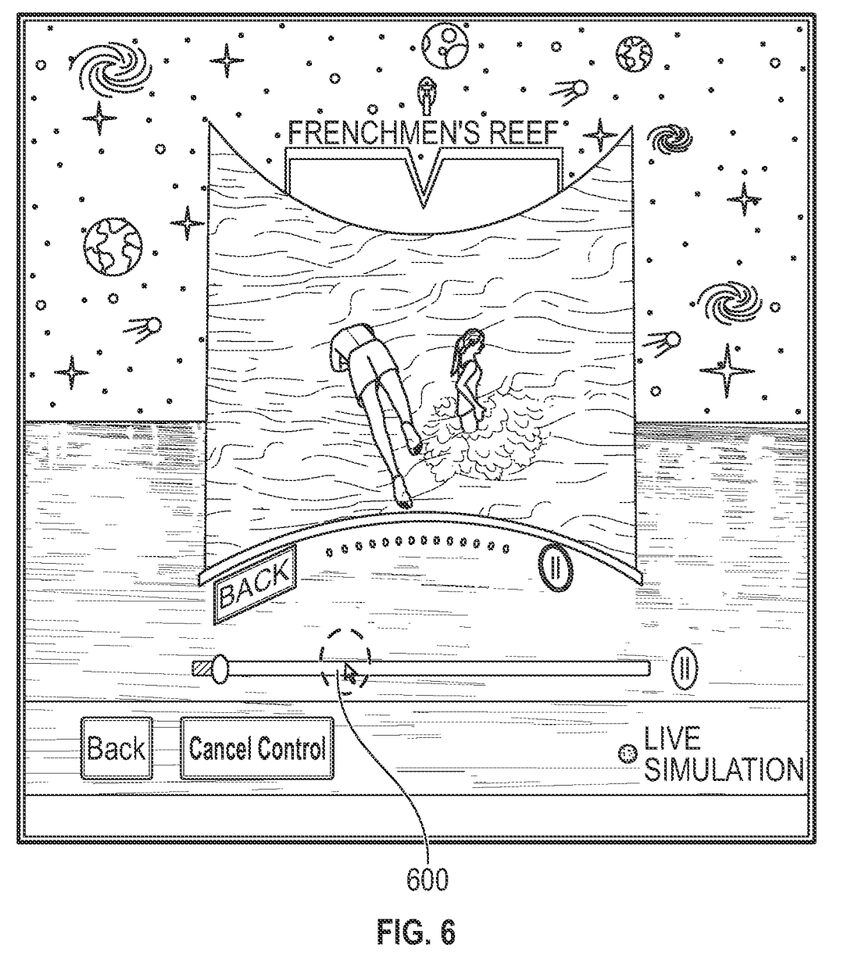
FIG. 6 is an example of yet another alternate user interface.

FIG. 6. illustrates a visual of the step 600 of FIG. 3, depicting the operator 40 making a selection.

While a particular form of the invention has been illustrated and described, it will be apparent that various modifications can be made without departing from the spirit and scope of the invention. For example, the icons, objects, tokens or placement are all variables that can be modified. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A computer implemented method of providing support from a live operator to a user in a virtual reality environment (VRE), comprising:

logging each task performed by the user in the VRE as an independent operational function, the tasks comprising at least one of: making a controller selection, performing a geometric position, and making an orientation change;

broadcasting an experience from the user in the VRE to the live operator by encoding payloads of data of the independent operational functions as sequential operations, wherein the payloads of data are streamed in real time to the live operator, and wherein broadcasting the experience is free from any streaming of video between the user and the live operator;

decoding the encoded payloads of data;

viewing, by the live operator, the experience of the user in the VRE;

enabling the live operator to have an interaction with the user in the VRE, wherein the interaction of the live operator with the user comprises permitting the live operator to take over the VRE, wherein permitting the live operator to take over the VRE comprises broadcasting actions taken by the live operator to the user as a computational instructional set of commands between the live operator and the user that are encoded, streamed and then decoded and processed as instructional commands presenting to the user, in the VRE, a live rendering or replay of the actions taken by the live operator; and affecting an anti-nausea filter by identifying one or more geospatial movement instructions in the instructional commands presenting to the user, in the VRE, the live rendering or replay of the actions taken by the live operator, and removing or modifying the one or more identified geospatial movement instructions.

2. The method of claim 1, wherein permitting the live operator to take over the VRE comprises encoding a live operator experience in the VRE as second payloads of data in sequential operations, wherein the second payloads of data are streamed in real time to the user and subsequently decoded.

3. The method of claim 2, wherein the second payloads of data includes at least one of activity data, metadata, direction movement data, screen location data and screen selection data.

4. The method of claim 1, wherein permitting the live operator to take over the VRE is free from any streaming of video between the live operator and the user.

5. The method of claim 1, further comprising receiving a request for support from the user operating in the VRE.

6. The method of claim 5, further comprising sending the request for support to the live operator.

7. The method of claim 5, wherein broadcasting the experience is performed in response to receiving the request for support.

8. The method of claim 1, wherein the interaction includes at least one of: voice chat assistance, virtual presence in the VRE, directional assistance, and order placement assistance.

9. The method of claim 1, wherein the live operator monitors the broadcast of the experience and the live operator is enabled to offer assistance to the user during the user experiencing the VRE.

10. The method of claim 1, wherein the live rendering or replay of the actions taken by the live operator is presented to the user, in the VRE, as if the live operator were themselves in the virtual reality experience.

11. One or more non-transitory computer readable storage medium tangibly embodying a computer readable program code having computer readable instructions that, when executed, causes a computer device to perform operations for providing support from a live operator to a user in a virtual reality environment (VRE), the operations comprising:

logging each task performed by the user in the VRE as an independent operational function, the tasks comprising at least one of: making a controller selection, performing a geometric position, and making an orientation change;

broadcasting an experience from the user in the VRE to the live operator by encoding payloads of data of the independent operational functions as sequential operations, wherein the payloads of data are streamed in real time to the live operator without any streaming of video between the user and the live operator;

decoding the encoded payloads of data;

viewing, by the live operator, the experience of the user in the VRE;

enabling the live operator to have an interaction with the user in the VRE, wherein the interaction of the live operator with the user comprises permitting the live operator to take over the VRE, wherein permitting the live operator to take over the VRE comprises broadcasting actions taken by the live operator to the user as a computational instructional set of commands between the live operator and the user that are encoded, streamed, and then decoded and processed as instructional commands presenting to the user, in the VRE, a live rendering or replay of the actions taken by the live operator; and affecting an anti-nausea filter by identifying one or more geospatial movement instructions in the instructional commands presenting to the user, in the VRE, the live rendering or replay of the actions taken by the live operator, and removing or modifying the one or more identified geospatial movement instructions.

12. The media of claim 11, wherein permitting the live operator to take over the VRE comprises encoding a live operator experience in the VRE as second payloads of data in sequential operations, wherein the second payloads of data are streamed in real time to the user and subsequently decoded.

13. The media of claim 12, wherein the second payloads of data includes at least one of activity data, metadata, direction movement data, screen location data and screen selection data.

14. The media of claim 11, wherein permitting the live operator to take over the VRE is free from any streaming of video between the live operator and the user.

15. The media of claim 11, the operations further comprise receiving a request for support from the user operating in the VRE.

16. The media of claim 15, the operations further comprise sending the request for support to the live operator.

17. The media of claim 15, wherein broadcasting the experience is performed in response to receiving the request for support.

18. The media of claim 11, wherein the interaction includes at least one of: voice chat assistance, virtual presence in the VRE, directional assistance, and order placement assistance.

19. The media of claim 11, wherein the live operator monitors the broadcast of the experience and the live operator is enabled to offer assistance to the user during the user experiencing the VRE.

20. The media of claim 11, wherein the live rendering or replay of the actions taken by the live operator is presented to the user, in the VRE, as if the live operator were themselves in the virtual reality experience.

* * * * *